United States Patent [19]

Sullivan et al.

[11] Patent Number: 4,515,399
[45] Date of Patent: May 7, 1985

[54] SYMMETRICALLY LOADED FLEXIBLE CONNECTOR HAVING MULTIPLE PASSAGEWAYS

[75] Inventors: Paul E. Sullivan, Euless; George W. Peppel, Arlington, both of Tex.

[73] Assignee: Lockheed Corporation, Burbank, Calif.

[21] Appl. No.: 453,634

[22] Filed: Dec. 27, 1982

[51] Int. Cl.³ .............................................. F16L 17/00
[52] U.S. Cl. ................................. 285/95; 285/137 R; 285/167; 285/234; 285/263; 285/DIG. 1
[58] Field of Search .................. 285/137 A, 263, 223, 285/234, 137 R, 167, 95, 49, 261, DIG. 1

[56] References Cited

U.S. PATENT DOCUMENTS

| | | | |
|---|---|---|---|
| 3,680,895 | 8/1972 | Herbert et al. | 285/261 X |
| 4,068,864 | 1/1978 | Herbert et al. | 285/263 X |
| 4,068,868 | 1/1978 | Ohrt | 285/223 X |
| 4,076,284 | 2/1978 | Herbert et al. | 285/263 |
| 4,098,527 | 7/1978 | Herbert et al. | 285/234 |
| 4,103,939 | 8/1978 | Herbert et al. | 285/137 A |

Primary Examiner—Dave W. Arola
Attorney, Agent, or Firm—Stanley L. Tate

[57] ABSTRACT

A housing (110) defines an enlarged central bore (162), from which protrudes a multi-conduit nipple (126). An elastomeric seal (128) flexibly joins the inner end of the nipple to the outer end of a respective sliding seat (116), the inner end of the seat being adapted to slide longitudinally within the central bore, whereby the elastomeric seal located is subjected to a shearing action as the nipple is pivotally deflected relative to the housing. One or more piston disks (174, 176) extend across the enlarged central bore so as to define a series of individual pressure chambers (182, 184, 186). A plurality of hollow cylindrical sleeves (188) extend through the disks, with the interior of each sleeve functioning as a continuation of a respective conduit through the connector. Preferably, for "N" conduits, there will be N sleeves and (N-1) pressure disks defining N pressure chambers, whereby there is provided for each conduit a corresponding pressure chamber and an individual pressure equalizing aperture (204) may be provided between the interior of each pressure chamber and its corresponding sleeve. Any difference in pressure between two pressure chambers will tend to force the pressure disk therebetween in the direction of the pressure differential, until the disk is in contact with the remote end of the chamber having the lower pressure. Accordingly, the compressive forces exerted on the flexible seals will be determined by the maximum pressure present. Furthermore, because the forces are symmetric about the connector's central longitudinal axis, the seat will not have any tendency to bind as it slides within the central bore.

5 Claims, 10 Drawing Figures

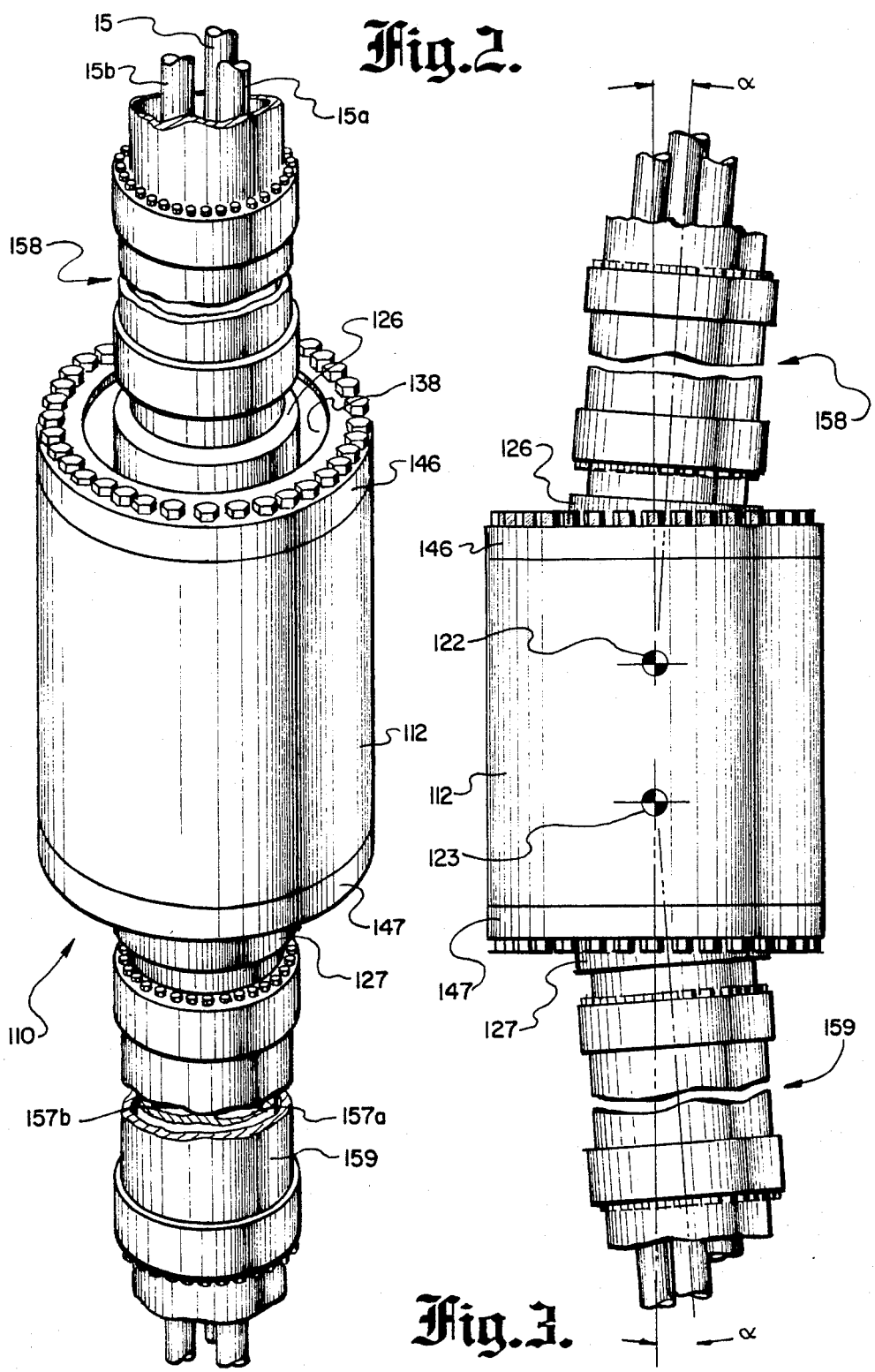

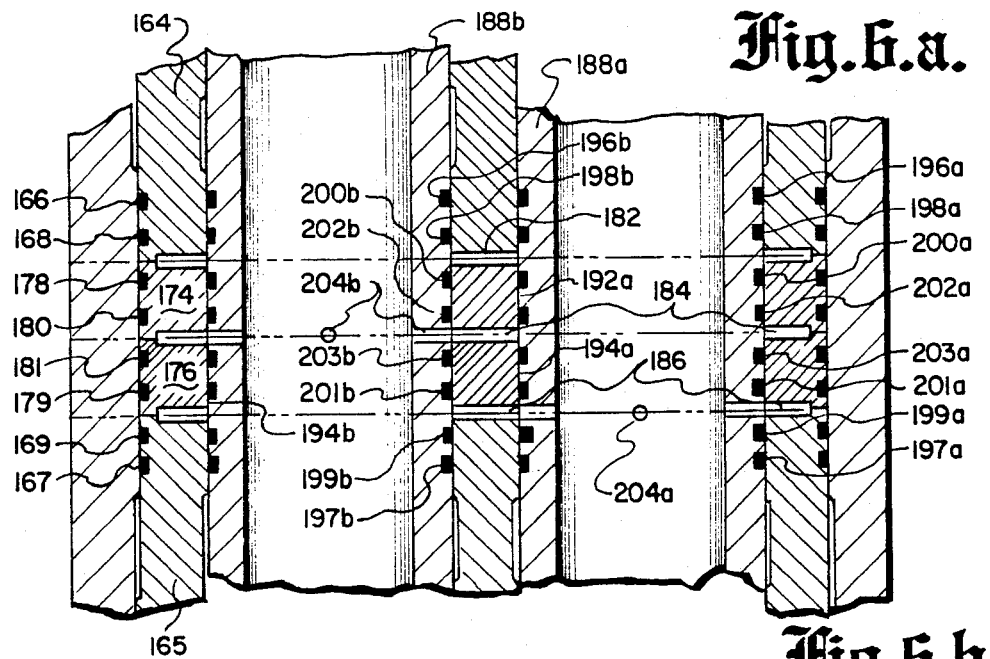
Fig.6.a.
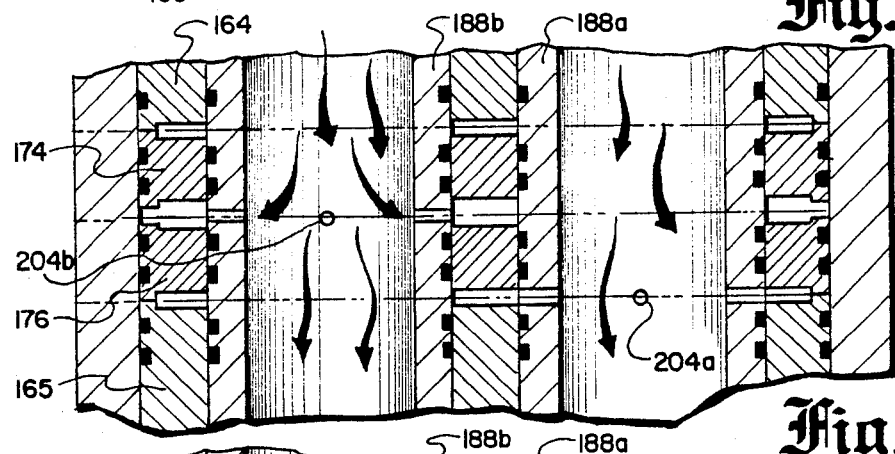
Fig.6.b.
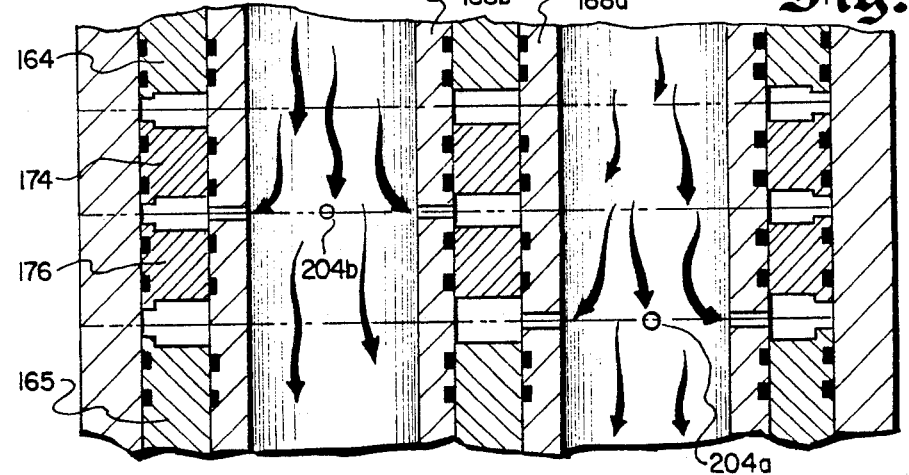
Fig.6.c.

SYMMETRICALLY LOADED FLEXIBLE CONNECTOR HAVING MULTIPLE PASSAGEWAYS

TECHNICAL FIELD

The disclosed invention relates generally to connectors for effecting fluid tight joints between two sections of a fluid conduit and more particularly to connectors which are adapted for effecting a flexible connection between a plurality of parallel conduits.

BACKGROUND ART

U.S. Pat. No. 4,103,939, dated Aug. 1, 1978 and entitled "Multi Passage Flexible Connector", discloses and claims a multi-channel flexible connector for connecting multiple parallel conduits. The input pipes are connected to a housing and the output pipes are connected to a nipple assembly that protrudes from the housing and is free to move angularly with respect thereto, the connector also being provided with a seat and an elastomeric body for accommodating the angular movements. The nipple is provided with a plurality of passages arranged in a circular fashion about the longitudinal axis of the connector. A corresponding plurality of passages is also provided in the elastomeric body, in the seat and in the housing. The inner and outer surfaces of a flared end of the nipple, as well as a plurality of spherical reinforcing rings within the elastomeric body, have their respective surfaces spherical with respect to a center of deflection located on the longitudinal axis of the housing. The elastomeric body is adhered to the opposing spherical surfaces on the nipple and the seat, and it consequently seals the respective passageways from each other and from the external environment at the interface between the nipple and the seat, while permitting the required angular movement. In order to effect a seal at the interface between the seat and the housing that will accommodate a limited longitudinal movement, the portion of the seat in the vicinity of each of the passageways is formed as an individual piston-shaped member and a corresponding cylindrical recess is provided in the housing with the required seal being maintained between each piston and its corresponding cylinder by means of a plurality of O-rings.

It will be appreciated that, when the pressure inside a particular bore of such a prior art connector exceeds the pressure of the external environment, then a force will be exerted on the face of the respective piston displaced from the coupling's longitudinal axis by an amount equal to the radial distance of the particular bore from the axis. This force will in turn be transmitted by the solid seat element to the elastomeric body and will have the beneficial effect of compressing the elastomeric body and thus promoting the sealing action thereof between the nipple and the seat. The magnitude of the force exerted on a particular one of the pistons is equal to the pressure differential between the interior of the corresponding passageway and the external environment times the effective cross-sectional area of the piston. Accordingly, provided that the pressure in each of the individual passageways is maintained at a fixed nominal value, then by appropriate selection of the cross-sectional area of each of the pistons, the various forces may be equalized such that there will be no resultant net torque exerted upon the seat element which could have the deleterious effect of tending to cause the individual piston portions to be tilted out of alignment and to bind in their respective cylindrical bores. This would interfere with the required compression of the elastomeric body and, especially as the elastomeric is subjected to continued shearing displacements, would thus result in a degradation of the fluid-tight seal and the eventual failure of the coupling.

U.S. Pat. No. 4,076,284, dated Feb. 28, 1978 and entitled "Ocean Floor Riser Connection" discloses and claims a flexible connector suitable for use to effect a flexible connection in the riser between a deep-sea oil well and an offshore floating platform. As noted in that patent, in such an environment a connector is subject to widely varying forces and may involve subjecting the riser connector to production pressures which could be substantially higher than the hydrostatic head on the outer periphery of the connector. The particular connectors disclosed in that patent have but a single passageway surrounded by an elastomeric sealing member which is maintained under compression by a combination of hydrostatic pressures outside of the unit as well as by the high pressures of the operating fluid within the passageway and by tension forces exerted on the connection, with O-rings being used to effect a fluid-tight joint between a collar located at the upper end of the elastomeric seal relative to an internal cylindrical surface of the housing.

U.S. Pat. No. 3,680,895, dated Aug. 1, 1972 and entitled "Flexible Joint Means", discloses and claims an omnidirectionally flexible joint for fluid conduits subject to high pressures and axial loads, including one embodiment having two inner housings that are capable of separate and independent flexing movements with respect to a common outer housing, whereby a given joint deflection can be accomplished by means of simultaneous deflection of both inner housings so that the load on each respective seal assembly may be cut to half of that which would otherwise have been required with the attendant advantages of lower operating stress on each of the seal assemblies and a longer service life.

However, offshore oil drilling and producing operations and, in particular, work-over operations frequently require the use of several contiguous riser passageways which must be sealed from one another and which will be subjected to greatly varying pressures. It will be apparent that the known prior art flexible connectors cannot readily be adapted for use in connecting the individual riser passageways to the wellhead manifold located on the bottom of the sea floor under such circumstances. Accordingly, it was the prior art practice to utilize rigid connections between the several riser passageways and the corresponding outlets on the manifold of the wellhead, and in the event that on account of heavy seas or other extreme conditions, excessive lateral forces would be exerted on the riser passageways required for the workover operation, then the riser passageways would be disconnected from the manifold and the riser pipes raised to the surface until the heavy seas had subsided.

Furthermore, it will be appreciated that excessive compressive forces on the elastomeric seal of a flexible connector are undesirable and that the compressive force preferably should be a function of the highest actual pressure then present in any of the bores, irrespective of the pressure in the other passages. Finally, because of the varying requirements associated with different applications of multi-bore flexible couplings, it is preferable to have a coupling whose components are modular and easily modified to accommodate various sizes, numbers and spacings of passageways, while still maintaining the required relatively uniform distribution of compressive forces on the elastomeric body functioning as the flexible sealing element and the desired relatively compact external configuration.

Accordingly, it is an overall objective of the present invention to provide an improved flexible connector having multiple passageways and an elastomeric seal for accommodating angular movement between the input conduits and the output conduits in which the compressive forces exerted on the elastomeric seal are distributed uniformly with respect to the connector's longitudinal axis.

It is another overall objective of the present invention to provide a flexible connector that will provide a plurality of passageways that will remain sealed from one another and from the external environment under adverse operating conditions during which the connector is subjected to repeated angular movements and the respective pressures inside the individual bores are subjected to wide variations with respect both to the external environment and to one another.

It is still another overall objective to provide a flexible coupling in which the elastomeric body that maintains the seal between the adjacent passageways is subjected to a variable compressive force determined by the greatest pressure in any of the bores.

It is an objective of at least one specific embodiment of the present invention to provide a coupling in which the angular displacement is divided equally between two sets of elastomeric bodies, so as to have the various forces resulting from the angular deflection of the coupling.

Yet another objective is to provide a flexible connector with individual modular components which may be easily changed or modified to accompany various sizes, numbers and spacings of passageways.

DISCLOSURE OF THE INVENTION

Briefly, a presently preferred embodiment of the invention comprises a symmetric housing defining an enlarged central bore. Protruding from each end of the housing is a multi-bore nipple assembly terminated at its outer end by a coupling flange. An elastomeric seal flexibly joins the inner end of each nipple assembly to the outer end of a respective sliding seat, the inner end of the seat being adapted to slide longitudinally within the central bore of the housing. The outer end of the seat defines a spherical surface that is concentric with an opposing inner spherical surface defined by the inner end of the nipple, whereby the elastomeric seal located between these two surfaces is subjected to a shearing action as the nipple is pivotally deflected relative to the housing about the common center of the spherical surfaces. The nipple is also provided with an outwardly facing surface secured to the housing by means of a flexible elastomeric thrust bearing. As the inner end of the seat moves outwardly from the central bore of the housing, the elastomeric seal and the elastomeric thrust bearing are both compressed. A similar seat and nipple assembly is also provided at the other end of the housing with the other seat's inner end also sliding within the same central bore of the housing. One or more piston plates are provided within the enlarged central bore and between the inner ends of the seats so as to define a series of individual pressure chambers. A plurality of hollow cylindrical sleeves connect the inner ends of the two seats, with the interior of each sleeve functioning as a continuation of a respective passageway through the connector, the sleeves being adapted to slide longitudinally within corresponding circular cut-outs in each of the pressure plates, with the respective ends of the sleeves adapted to slide longitudinally within corresponding cylindrical recesses defined in the inner ends of the seats so as to permit one seat to move longitudinally with respect to the other. Preferably, for "N" passageways, there will be N sleeves and (N-1) pressure plates, whereby there is provided for each passageway a corresponding pressure chamber and an individual pressure equalizing aperture may be provided between the interior of each pressure chamber and its corresponding sleeve. Seals are provided between the individual piston plates, the central bore, the seats and the individual sleeves, whereby different pressures and fluids may be maintained in each individual conduit and its corresponding passageways and pressure chamber. Any difference in pressure between two pressure chambers will tend to force the pressure plate therebetween in the direction of the pressure differential, until the plate is in contact with the remote end of the chamber having the lower pressure. Accordingly, the compressive forces exerted on the flexible seals will be determined by the product of the maximum pressure present in any of the bore passageways, times the cross-sectional area of the piston plates. Furthermore, because the forces are symmetric about the connector's central longitudinal axis, the seat will not have any tendency to bind as it slides within the central bore of the housing.

BRIEF DESCRIPTION OF DRAWINGS

FIG. 2 is an isometric view of a first embodiment of an improved multiple passageway flexible connector in accordance with the present invention;

FIG. 3 is a side elevational view of the connector of FIG. 2 showing the connector in an angularly flexed position;

FIG. 6 comprising three sub figures labeled respectively A, B, and C, is a set of enlarged views of the central piston portion of FIG. 4 showing how the nipples and piston plates move relative to one another as varying pressures are applied to the individual passageways through the connector;

BEST MODE FOR CARRYING OUT THE INVENTION

Figure 1:
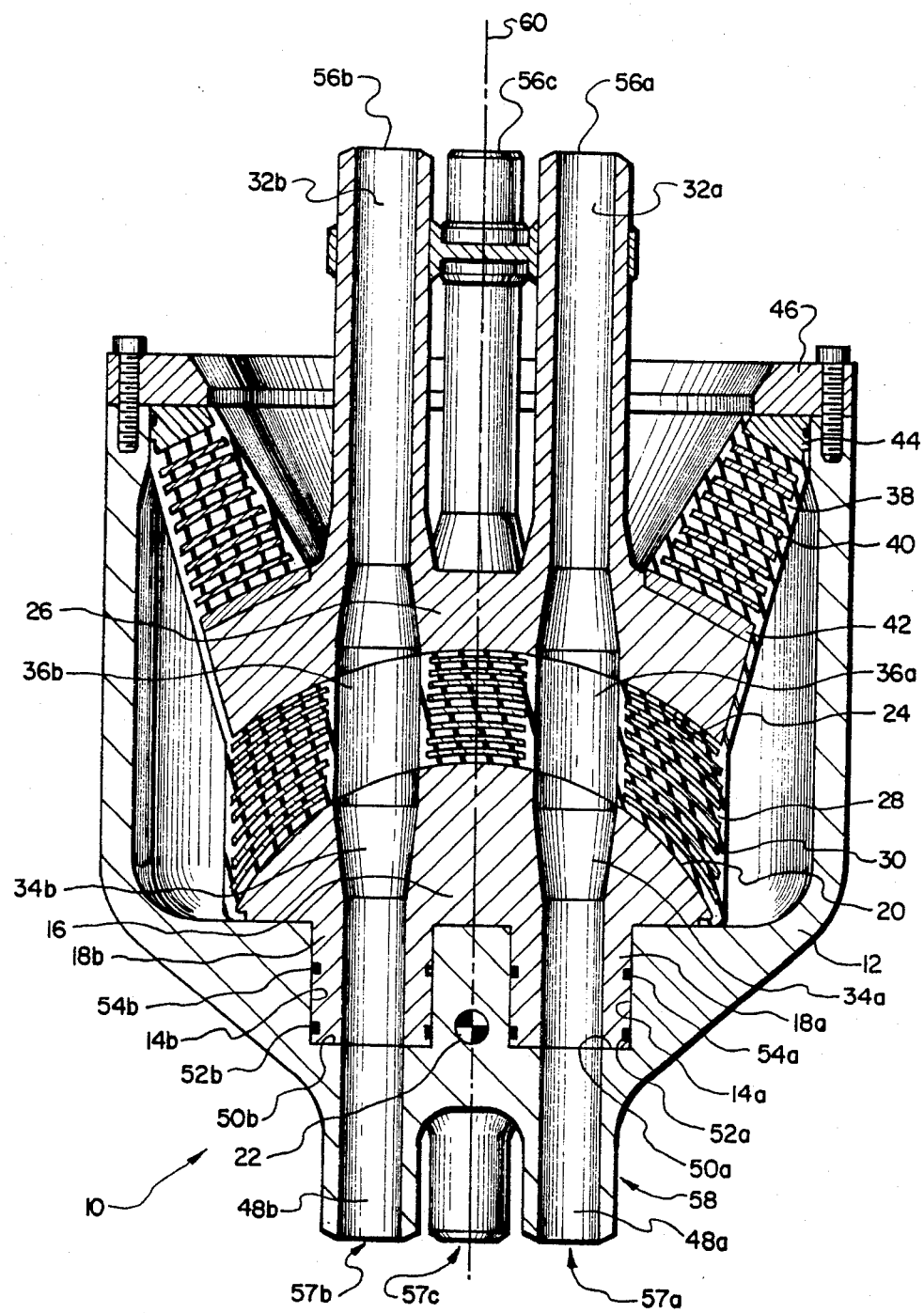
FIG. 1 is a cross section of a multiple passageway flexible connector constructed in accordance with the teachings of the prior art.

Reference should be now made to FIG. 1 of the drawings which it will be recalled depicts a prior art type of multichannel flexible connector for connecting multiple parallel conduits for relative angular deflection between input and output conduits, such as is taught by the above reference U.S. Pat. No. 4,103,939.

In particular it will be seen that the connector (10) is provided with a housing (12) in which there is defined a plurality of individual cylindrical recesses (14A, 14B); a seat assembly (16) includes a plurality of individual piston portions (18A, 18B) adapted to slide longitudinally within the aforesaid cylindrical bores (14A, 14B). The outer end of the seat (16) is provided with a convex spherical surface (20) oriented about a center of curvature (22). Adjacent the convex spherical surface (20) but spaced somewhat apart therefrom is a corresponding concave spherical surface (24) defined on the inner end of a nipple assembly (26), the concave spherical surface (24) also having its center of curvature about the common center point (22). The concave spherical surface (24) is connected to the convex spherical surface (20) by means of a bonded reinforced elastomeric sealing body (28) containing a plurality of metal reinforcements (30). A first set of passageways (320A, 32B) extends laterally within the nipple assembly (26) and terminates at the nipple assembly's inner surface (24). A corresponding plurality of passageways (34A, 36B) extend longitudinally within the seat assembly (16) and terminate at the outer surface (20) thereof. Corresponding apertures (36A, 36B) in the elastomeric body (28) function as continuation passageways from the respective set of first passageways (32A, 32B) to the respective second set of passageways (34A, 34B). It will thus be appreciated that the elastomeric body (28) functions to maintain a fluid-tight seal between the individual conduits and also between the conduits and the external environment, while nevertheless permitting angular deflection of the nipple assembly (26) relative to the housing (12) and the seat assembly (16).

The prior art connector shown in FIG. 1 utilizes a second elastomeric body (38) having reinforcing plates (40) and positioned between an outwardly directed annular ledge (42) provided as part of the nipple assembly (26) and an inwardly directed annular surface (44). The elastomeric body (38) is restrained from further outward longitudinal movement relative to the housing (12) by means of a retaining ring (46). Preferably the respective inner and outer terminations (42, 44) of the thrust bearing elastomeric body (38) are respectively convex and concave in form and are concentric with respect to center point (22) and the elastomeric body (38) is provided with spherical reenforcing rings (40) also oriented about said common center point (22), so that any compressive forces transmitted through the elastomeric body (38) will remain essentially constant as the nipple assembly (26) is tilted with respect to the housing (12) and will be oriented radially with respects to the common center point (22).

Referring now specifically to the lower portion of FIG. 1, it will be seen that the housing (12) is provided with a third set of passageways (48A, 48B) which terminate at their respective upper ends at the respective bottom surfaces (50A, 50B) of the cylindrical recesses (14A, 14B) defined in the housing (12), where they meet the respective lower ends of the second set of passageways (34A, 34B). Appropriate seal rings (52A, 52B, 54A, 54B) are provided between the outer circumferential surface about each seat cylindrical piston (18A, 18B) and the corresponding inner circumferential surface of the cylindrical recess (14A, 14B).

Accordingly, the prior art structure shown in FIG. 1 provides a connector for connecting a first set of parallel conduits (56A, etc.) attached to the nipple assembly (26) with a second similar set of parallel conduits (57A, etc.) attached to a terminating portion (58) at the bottom of the housing (12), with each individual first passageway (32A) in the nipple assembly being maintained in fluid tight communication with a corresponding third passageway (48A) in the housing's terminating region (52) via an aperture (36A) in the elastomeric body (28) and a second passageway (34A) in the seat assembly (16), the elastomeric body (28) maintaining the fluid-tight relationship between the first passageway (32A) and the second passageway (34A), and the sliding seal rings (52A, etc.) maintaining the fluid tight relationship between the second passageway (34A) and the third passageway (48A).

When initially manufactured and assembled, the dimensional relationships between the various above described components are preferably such that as the retaining ring (46) is assembled in position onto the housing (12), the thrust bearing elastomeric assembly (40) is compressed radially towards the center point (22), thereby maintaining the elastomeric sealing body (28) in radial compression with respect to the center point (22) and also resisting any tendency of the the sealing elastomeric body (28) to become disbonded or ruptured as a result of the pressurized fluid flowing through its apertures (36A, 36B). It will be appreciated, however, that in addition to the compressive forces exerted on the elastomeric seal (28) as a result of the above described preloading during the original assembly of the connector (10), when the connector is in actual use there will also be compressive forces exerted on the lower face of the piston-like elements (18A) by the pressurized fluid within the corresponding passageway (34A, 48A) which will pressurize that portion of the interface between the seat's piston portion (14A) the housing cylindrical recess (14A) connecting the passageway (34A) with the lower of the two seals (52A); however, (as mentioned previously) since each of the individual pistons (14A, 14B) has its respective longitudinal axis displaced radially from the longitudinal axis (60) of the seat assembly (16), variations of pressure in one of the conduits (56A, 57A) relative to another conduit (56B, 57B) will tend to angularly deflect the seat assembly (16) relative to the housing (12) and to cause the individual piston portions (18A, 18B) to stick or bind within their respective cylindrical recesses (14A, 14B) in the housing (12), thus preventing the compressive forces generated by the fluid pressure inside the respective conduits from being exerted on the elastomeric seal assembly (28). If the nipple assembly (26) is longitudinally displaced away from the lower terminal assembly (58) as a result of axial tensile forces being applied to the conduit, the resultant tensile forces forces exerted across the seal (28) will further accelerate the degradation of the seal between the elastomeric body (28) and the corresponding convex and concave surfaces (20, 24).

Reference should now be made to FIGS. 2 through 9 which illustrate a first embodiment of the present invention. From FIGS. 2 and 3 it will be seen that this embodiment is a so-called double-ended flexible joint (110) in which a central housing (112) is flexibly connected to two nipple assemblies, namely an upper nipple assembly (126) and a lower nipple assembly (127). (It should be noted that in this and subsequent figures, to the extent that structure of the first embodiment of the present invention is analogous to similar structure found in the prior art embodiment of FIG. 1, it will be designated by the same reference numeral preceded by a "1" to result in a three-digit number, while structure in the second embodiment which will follow a similar convention but will be preceded by a "3". Furthermore, odd reference numerals will be used to designate elements in the lower half of the connector.) In FIGS. 2 and 3 may also be seen the respective upper and lower retaining rings (146, 147) which, as will become more clear hereinafter with reference to FIG. 4, maintain the internal elastomeric components of the flexible connector under compression when the device is initially fabricated in order to effect a better sealing between adjacent conduits (156A, 157A; 156B, 157B) and the external environment. Immediately above the upper nipple assembly (126) and below the lower nipple assembly (127) there are provided respective adapter fittings (158, 159) which provide a gradual transition from the relatively small diameter of the closely spaced parallel external conduits (156A, 156B, 156C, 157A, 157B, 157C) to the relatively large diameter of the spaced apart passageways (148A, 148B, 148C) provided in the central housing (112) (see also FIG. 4).

Both the upper nipple assembly (126) and the upper adaptor coupling (158) on the one hand and the lower nipple assembly (127) and the lower adaptor coupling (159) on the other hand are free to swivel about respective center points (122 and 123) up to a maximum angle (α) so as to provide a total angular deviation of 2α between the central axis of the upper assembly and the corresponding axis of the lower assembly. (See FIG. 5) In a typical application, the lower adaptor coupling (159) is connected to the well-head manifold located on the bottom of the sea floor and the upper adaptor coupling (158) extends toward a floating platform; the motion of the platform relative to the sea floor is accommodated by the angular flexing of the connector assembly (110).

Normally, the ends of the adaptor couplings (158, 159) remote from the central housing (112) will provide a tapered transition to a conduit diameter determined by the particular requirements as to pressure and rate of flow of a specific application. By making the passageways internal to the connector housing (112) of a uniform, relatively large diameter that is capable of accommodating a range of specific end-application requirements, the connector may be more easily adapted to other applications merely by changing the adaptor couplings (158, 159).

Figure 4:
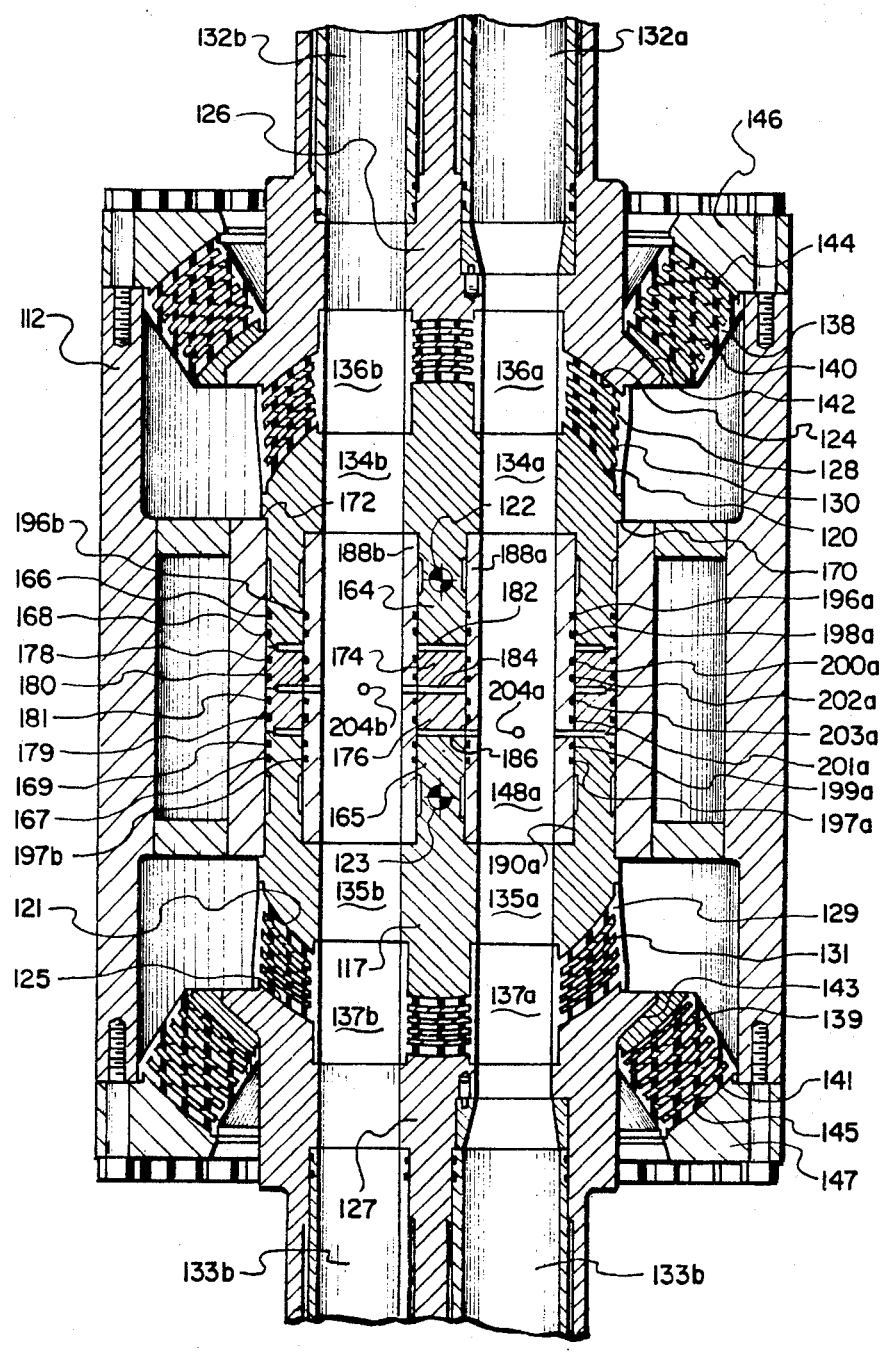
FIG. 4 is a longitudinal cross-section view through the connector of FIG. 2.

Reference should now be made to FIG. 4 which is a longitudinal cross-section view through the connector (110) of FIG. 2 and in particular of the central housing portion (112) thereof. From this Figure it will be seen that along the longitudinal axis of the central housing (112) there is provided a central bore (162) within which the upper sliding seat assembly (116) and the lower seat assembly (117) are both free to slide along the axial direction of the bore, as will become more clear hereinafter. Protruding from either end of the housing (112) are respective upper and lower nipple assemblies (126, 127) restained axially with respect to the housing (112) by means of upper and lower retaining rings (146, 147) which exert respective inwardly directed thrust forces against respective outwardly facing annular ledges (142, 143) provided as parts of the nipple assemblies (126, 127), the thrust force from the retaining rings (146, 147) to the angular ledges (142, 143) being transmitted via respective elastomeric rings (138, 139); thus a respective retaining ring (146), elastomeric ring (138) and nipple ledge (142) together function as a thrust bearing. In a manner similar to the prior art connector of FIG. 1, the interface between the elastomer (138, 139) and the retaining rings (146, 147) and between the elastomer (138, 139) and the annular ledges (142, 143) of the nipple assemblies (126, 127) may be oriented co-spherically about the respective center points (122, 123), as are the individual reinforcing members (158) contained within the elastomeric rings (140, 141). The elastomer's size and shape and, in particular, its resistance to shear about its center point (122, 123), is such that the desired maximum angular deflection can be accommodated without distorting the elastomeric material to the extent that it is liable to tear or otherwise become permanently deformed.

Upper and lower elastomeric sealing elements (128, 129) are provided within the central housing (112) and function to provide a fluid-tight seal between the concave spherical surface (124, 125) at the inner end of the nipple assembly (126, 127) and the convex spherical surface (120, 121) at the outer end of the sliding seat (116, 117). The two opposing surfaces (120, 124) as well as the individual reinforcing plates (130) contained within the elastomeric seal (128) are all oriented co-spherically about the upper center point (122), as are the corresponding elements (121, 125, 131) in the lower half of the housing (122) except they are located about the lower center point (123).

Still referring to FIG. 4, reference should now be made to the structure contained within the central bore (162). In particular, it will be noted that the upper sliding seat assembly (116) and the lower sliding seat assembly (117) are each provided with an inwardly facing piston portion (164, 165) dimensioned so as to slide within the central bore (162) and thereby restrain the movement of its respective sliding seat (116, 117) to movement along the longitudinal axis of the bore. A fluid-tight seal is maintained between the respective piston portions (164, 165) and the bore (162) by means of a plurality of O-rings (166, 168, 167, 169), the first two being associated with the upper piston (164) and the latter two being associated with the lower piston (165). Excessive outward movement of the respective sliding seat assemblies (116, 117) is limited by the above-described elastomeric thrust bearing assemblies (138, 140, 146; 139, 141, 147) as aforesaid; inward motion is limited by means of a shoulder (170) on the sliding seat (116) which, when in its fully inward position as shown in FIG. 4, abuts against a corresponding ledge (172) provided about the outer end of the bore (162). Separating the opposing inner ends of the piston portions (164, 165) are circular piston plates (174, 176) which are also diametrically dimensioned so as to slide along the longitudinal axis of the bore (162) and are each also provided with O-rings (178, 180) to provide a fluid-tight seal between the outer diameter of each piston plate (174, 176) and the inner diameter of the bore (162). By this means there is defined a plurality of individual pressure equalizing chambers, the first (182) being between the inner end of the upper seat assembly (116) and the outer surface of the first piston (172) (as indicated by the reference numeral (180)), the second such chamber (184) being defined by the second face of the first piston plate (174) and a first face of the second piston plate (176) and the third such equalizing chamber (186) being defined between the second face of second piston plate (176) and the inner face of the lower sliding seat (117). For reasons that will become more clear hereinafter, the objectives of the present invention are best achieved when an individual such pressure equalizing chamber (182, 184 or 186) is provided for each of the individual passageways associated with the flexible connector assembly. In the case of the illustrated embodiment, there are three such passageways, the first being identified by the suffix (A), the second being identified by the suffix (B), and the third such passageway being identified by the suffix (C).

A hollow cylindrical sleeve (188A, 1884B, 188C) is provided for each of the passageways and functions to serve as a continuation of the passageway from the corresponding portion (134A, etc.) in the upper seat to the portion (135A, etc.) in the lower seat. The cylindrical sleeve (188A) has its outer diameter dimensioned such as to slide within corresponding inwardly facing cylindrical recesses (190A, 191A) in the respective seat assemblies and also within circular cutouts (192A, 194A) respectively through the first and second piston plates (174, 176). A plurality of paired O-rings (196A, 198A; 200A, 202A; 203A, 201A; 199A, 197A) are provided about the outer circumference of the cylindrical sleeve (188A) so as to effect respective fluid-tight seals between the sleeve (188A) and the upper cylindrical recess (190A), the first circular cutout (192A), the second circular cutout (194A), and the lower cylindrical recess (191A) respectively. Thus it can be seen that even as the upper sliding seat (116), the lower sliding seat (117) and the two piston plates (174, 176) slide longitudinally with respect to one another, each of the passageways (132A, etc., 132B, etc., 132C, etc.) through the flexible connector remains sealed from one another and from the external environment. In order that the first pressure equalizing chamber (182) may be maintained at the same pressure as inside the "A" passageway, a plurality of small apertures (204A) are provided therebetween the longitudinal location of the passageway (200A) being such that it is between the lower O-ring (198A) sealing the cylindrical sleeve to the upper cylindrical recess and the upper seal (200A) between the sleeve and the first piston plate (174). In a similar fashion, the "B" apertures (204B) communicating with the second diameter (184) are located between the second and third pairs of O-rings (202B, 203B) on the "B" sleeve (188B), and the "C" apertures (204C) communicating with the third chamber (186) are located between the third and four pairs of O-rings (201C, 199C) on the "C" sleeve (188C).

Figure 5:
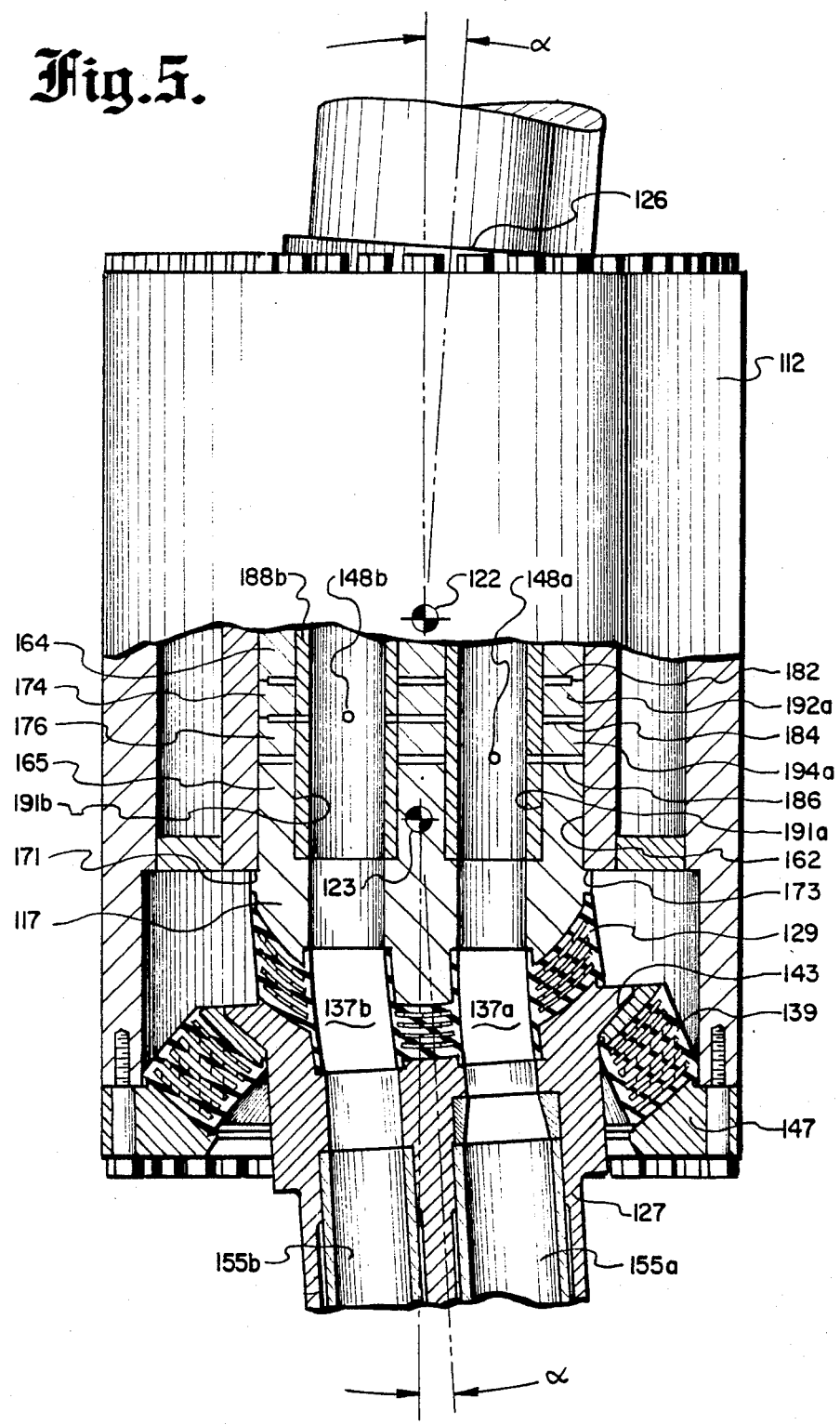
FIG. 5 shows the connector of FIG. 4 in its angularly deflected state with a portion of the connector being shown in side elevational view and a portion in longitudinal cross section.

Reference should now be made to FIG. 5 which it will be recalled shows the connector (110) of FIG. 4 in its angularly deflected state with a portion of the connector being shown as a side elevational view (the upper part of the Figure) and a portion in longitudinal cross-section (the lower part of the Figure). In particular, the upper nipple assembly (126) is tilted to the left relative to housing (112) by an angle $\alpha$ with respect to an upper pivot point (122) and the lower nipple assembly (127) is also rotated to the left by the same amount $\alpha$, but about a lower pivot point (123). As can be seen in the lower portion of the Figure, the illustrated twisting angular movement is accommodated by shear distortion of the elastomeric material comprising the elastomeric seal (129) and the elastomeric compression ring (139). This shear is oriented in a direction generally parallel to the surface of a sphere concentric about the relevant pivot point (123). Since the resultant forces on the elastomer are the result of shearing in a direction essentially normal to the longitudinal axis of the respective apertures (137A, 137B) provided in the elastomeric seal (129), it will be appreciated that the spacing between the sliding seat assembly (117) and the tilting nipple (127) will remain essentially unaffected by the tilting of the nipple assembly (127, 126) relative to the central housing (112). However, since the nipple (127) is free to slide within the central bore (162), it will still be possible to compensate for any possible minor changes in thickness resulting from considerations such as aging, creepage, and fluctuations in external pressure. A similar consideration also holds for the elastomeric compression ring (139); since it is also configured spherically about the pivot point (123), tilting movement of the nipple assembly (127) will subject its elastomer only to shear forces in a direction normal to that of a radial line from the pivot point (123).

An initial compressive force is applied to the elastomeric seal (129) by the upper and lower elastomeric compression rings (138, 139); and furthermore, when the connector (110) is in use, additional forces within the three pressure equalizing chambers (182, 184, 186) will result in an outward pressure being applied to the sliding seat (117). Accordingly, the effective operational lifetime for the elastomeric seal (128, 129) will be more than adequate for its intended application even though the elastomer must withstand severe angular forces resulting from the motion of the floating platform relative to the sea floor, to which the upper and lower conduits (154A, etc.; 155A, etc.) respectively lead.

Reference should now be made to FIG. 6 which it will be seen is comprised of three sub-figures, namely, FIGS. 6A, 6B, and 6C, respectfully showing the relative movement of the upper and lower sliding seats (163, 165) relative to the central bore (162), and also the changes in the three pressure equalizing chambers (182, 184, and 186) located therebetween, as the working pressures within individual central passageways (148A, 148B, 148C) are varied from all low to mixed high and low to all high.

In particular, FIG. 6A shows the "at-rest" condition in which the respective fluid pressures inside the several independent passageways (144A, 144B, etc.) are all relatively low and, accordingly, the combination of external hydostatic forces and the compressive forces exerted by the assembled annular thrust rings (138, 139) have forced the two sliding seat assemblies (164, 165) towards one another to the point where the upper seat (164) is in contact with the upper piston disk (174) which in turn is in contact with the lower piston disk (176) which is in contact with the lower seat (165) thereby resulting in the shrinking of the three pressure equalizing chambers (182, 184 and 186) to their minimal volumetric configuration.

It will be noted that a first set of pressure equalizing apertures (204A) provide an unobstructed path between the interior bore (148A) of the "A" sleeve (188A) and the first pressure equalizing chamber (182). In a similar manner, a second set of aperatures (204B) associated with the "B" conduit provides a fluid path between the interior passageways (148B) of the "B" sleeve (188B) and the second pressure equalizing chamber (184). Although not visible in FIG. 6, a third such set of apertures are provided between the third pressure equalizing chamber (186) and the interior of the "C" sleeve. Thus, any fluid trapped in one of the three chambers (182, 184, 186) is free to flow into or out of the corresponding one of the three central passageways (148A, 148B, 148C) as the volume of the chamber is changed as a result of movement of the upper seat (164) relative to the lower seat (165).

Now referring particularly to FIG. 6B, the "A" passageway (148A) is shown as containing a fluid flowing under relatively low pressure, while the "B" passageway (148B) contains a fluid flowing under relatively high pressure. Although not visible in this Figure, it should be understood that there may also be a flow of fluid through the "C" passageway without affecting the relative positions of the various elements visible in FIG. 6B, provided that the pressure in the "C" passageway is less than the high pressure in the "B" passageway (it may be greater than, equal to, or less than that of the "A" passageway, however). Thus, as shown in the Figure, the greater pressure associated with the second passageway (148B) is also present within the corresponding second pressure equalizing chamber (184) as a result of the corresponding pressure equalizing apertures (204B) communicating therebetween. Furthermore, since the pressure in the second passageway (148B) is assumed to be higher than that of either the first passageway (148A) or the third passageway (not visible in the Figure), the pressure inside the second chamber (184) will be greater than that in the first pressure equalizing chamber (182) or in the third pressure equalizing chamber (186). As a result of this pressure differential, the upper piston disk (174) whose lower surface defines a portion of the second chamber (184) will be subjected to an upwards force urging it towards the upper sliding seat (116) while the lower piston disk (176) whose upper surface defines in part the second chamber (184) will be subjected to a downwards force until it is in contact with the upper surface of the lower sliding seat (117); thus, the greatest of the various pressures contained within the various passageways flowing through the connector (110) will be applied to that area of the upper piston portion (164) and of the lower piston portion (165) inside the central bore (162) exclusive of the area occupied by the three sleeves (188A, 188B and 188C). Furthermore, it will be appreciated that the pressure from the second chamber (184) thus exerted on the piston portions (164, 165) of the upper and lower sliding seats (116, 117 respectively), via the resultant physical contact with the respective upper and lower piston disks (174, 176), will function to exert a compressive force across the elastomeric seals (128, 129) so as to, in effect, enhance their sealing action.

It will be noted that respective second pairs of smaller diameter O-rings (200A, 202A; 200B, 202B; etc.) serve to prevent the higher pressure fluid present in the second chamber (184) from leaking across the outer surfaces of the respective sleeves (188A, 188B, etc.) into the lower pressure present in the first chamber (182). In a similar fashion, the outer large diameter O-rings (178, 180) prevent any fluid leakage from the high pressure chamber (184) to the low pressure chamber (182) via the inner surface of the cylindrical bore (162). The third pair of smaller diameter O-rings (203A, 201A; 203B, 201B, etc.) and the third pair of large diameter O-rings (181, 179) prevent any leakage between the second chamber (184) and the third chamber (186).

As is best seen in FIG. 4, the function of the uppermost O-rings (196A, 198A; 196B, 198B, etc.; 166, 168) is to prevent any fluid leakage from upper chamber (182) past the ledge (172) to the external environment or past the cylindrical recess (190A, 190B, etc.) to those passageways (148B, 148C) not otherwise in communication with the upper chamber (182). An analogous function is performed by the lower pairs of O-rings (199A, 197A; 199B, 197B; etc. 169, 167) with respect to the lower ledge (173) and the lower cylindrical recesses (190A, 191B, etc.).

Referring now to FIG. 6C, it will be seen that this Figure shows all three of the passageways (148A, 148B, and 148C (not visible)) respectively in communication with the upper chamber (182), the center chamber (184) and the lower chamber (186) pressurized to the same high operating level, thereby forcing the opposing ends of the upper seat piston portion (164) and the lower seat piston portion (165) away from each other and allowing the piston disks (174, 176) freedom to float therebetween, since the pressure of the fluid above each of the disks is the same as that below it.

Figure 7:
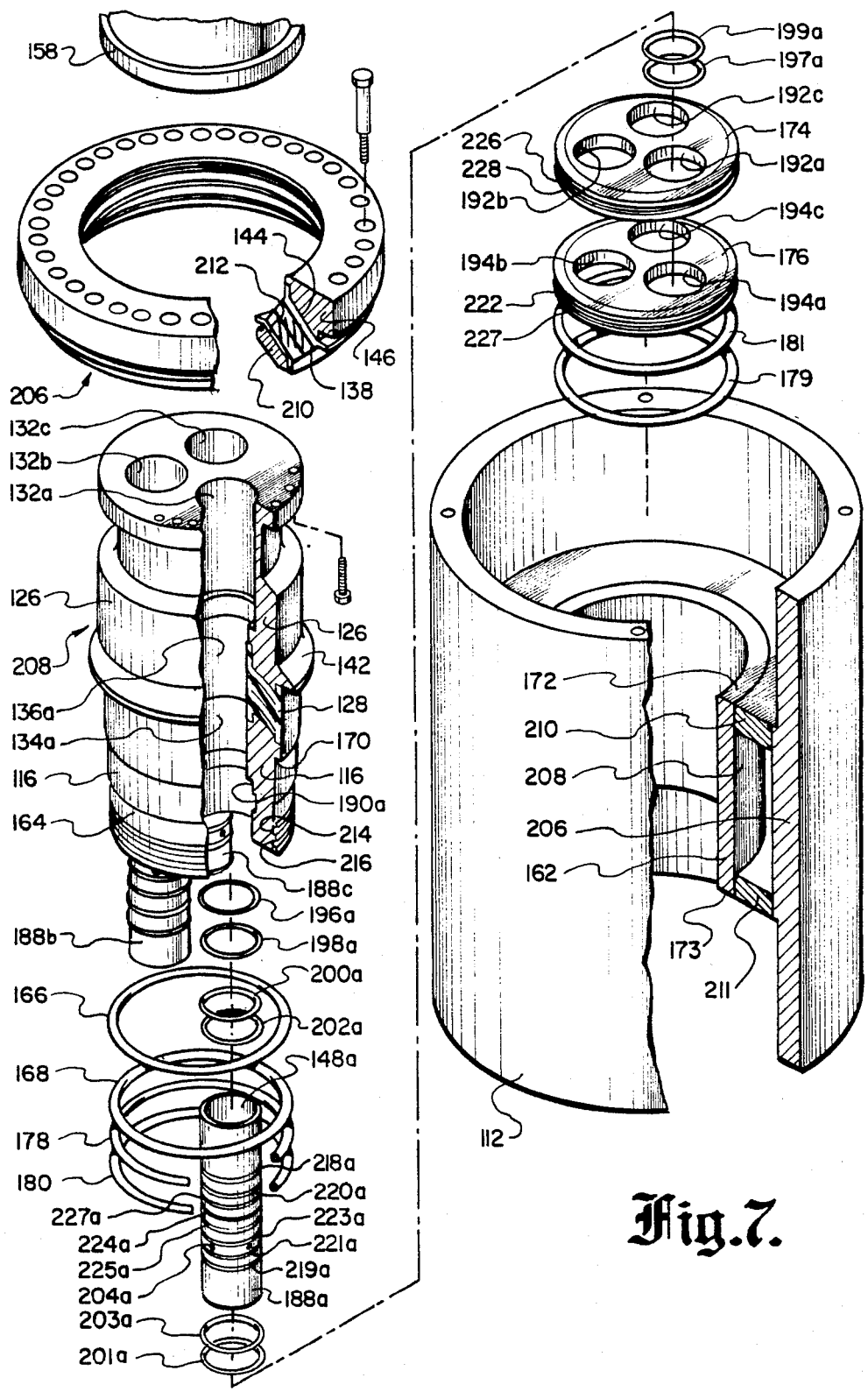
FIG. 7 is an exploded isometric view of the various components and subassemblies that comprise the connector of FIG. 1 with certain portions partially cut away to better show details of internal construction.

Referring now to FIG. 7, a presently preferred form of construction of the above-described connectors can be better appreciated. It should be noted that this Figure shows only an upper elastomeric compression subassembly (206) comprising the upper elastomeric ring (138) and the upper retaining ring (146), and an upper seal subassembly (208) comprising the upper nipple (126), the upper seal (128) and the upper sliding seat (116); the corresponding lower subassemblies, namely the lower compression ring subassembly (207) and the lower seal subassembly (209) may be identical to the illustrated upper subassemblies except they are inverted in orientation.

The main housing (112) is fabricated from a cylindrical outer shell (206), an inner cylindrical insert (208) and a pair of annular disks all welded together to form a rigid subassembly, with the interior of the cylindrical shell (208) functioning as the central bore (162) and its upper and lower surfaces functioning respectively as the upper ledge (172) and the lower ledge (173).

The upper elastomeric compression subassembly (206) is formed by bonding the elastomeric compression ring (138) to the upper metallic retaining ring (146) along the concave annular surface (144) to form a first elastomer-metal interface, and to a lower metallic spacer ring (210) to form a second elastomer-metal interface (212). As noted previously, both the upper and the lower interfaces are oriented co-spherically about the upper center of curvature (122) (See FIG. 4). In a similar fashion, the upper seal subassembly (208) is fabricated by bonding the elastomeric sealing ring (128) to the metallic nipple (126) at the nipple concave surface (120) and at the elastomer-metal interface where the seat convex surface (120) meets the elastomeric seal (128).

The two upper large diameter O-rings (166 and 168) are assembled into corresponding O-ring grooves (214, 216) provided about the periphery of piston portion (164) of the sliding seal subassembly (208). The seal subassembly is then ready for the final assembly of the connector (110).

The three sleeves (188A, 188B, 188C) respectively are prepared for final assembly by installing the corresponding smaller diameter O-rings (196A, 198A, etc.) within corresponding O-ring grooves (218A, 220A, 222A, 224A, 225A, 223A, 221A and 219A) defined in the outer surface of the sleeves. In a similar fashion, the third and fourth large diameter O-rings (178 and 180) are installed into corresponding grooves (226, 228) defined about the outer circumference of upper piston disk (174) and the third and fourth large diameter O-rings (181, 179) are similarly installed within corresponding grooves (229, 227) defined about the circumference of lower piston disk (176). At this stage, the three sleeves may the be installed into the corresponding cylindrical recesses (190A, etc.) at the lower end of the upper sliding seal assembly (208) and the two piston disks then placed in position relative to the seat subassembly (208) with the three cutouts (192A, 192B, 192C; 194A, 194B, 194C) aligned with the corresponding sleeves (188A, 188B, 188C).

At this point, a lower sliding seal assembly (209, not shown in FIG. 7) should be prepared complete with the two lower most large diameter O-rings (169, 167), whereupon the upper subassembly (208) together with the above noted O-ring seals and sleeves may be assembled to the housing (112) with the seat piston portion (164) projecting into the housing central bore (162) until the shoulder (170) is in contact with the ledge (172); the lower sliding seal assembly may then be installed from the opposite direction with its three cylindrical recesses (191A, 191B, 191C) aligned respectively with the three sleeves (188A, 188B, 188C).

It should be understood that the upper seal assembly (208), the lower seal assembly (209) and the two piston disks (174, 176) can each be rotated by 120 degrees with respect to the other without any change in the appearance or function of the assembled connector because of the trilateral symmetry of each of these components. However, care should be taken during assembly process to ensure that the three sleeves (188A, 188B, and 188C) are installed such that the corresponding apertures (204A, 204B and 204C) are each at a different level, corresponding to a different one of the three pressure chambers (182, 184, 186).

Figure 8:
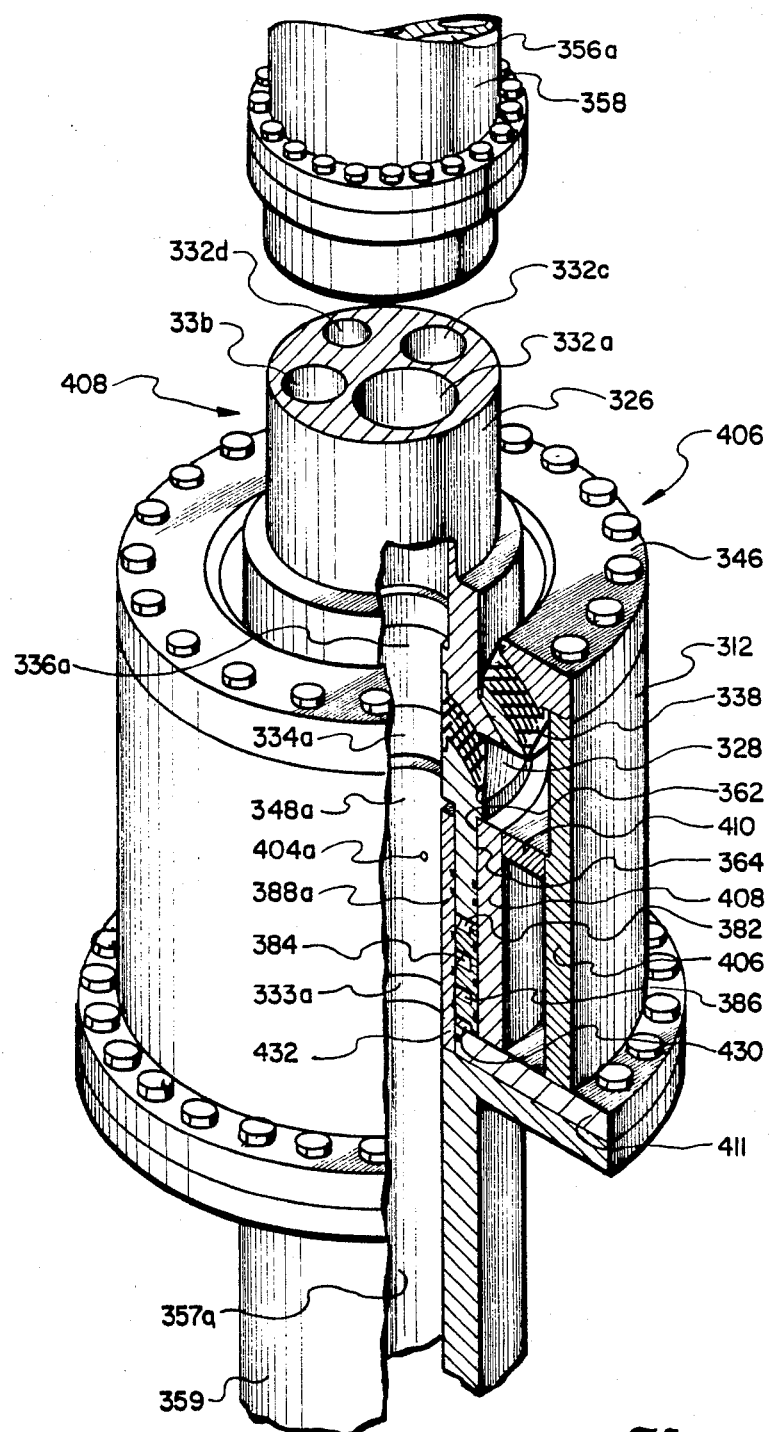
FIG. 8 is a partially cut away isometric view of an alternative embodiment of a multiple passageway flexible connector constructed in accordance with the present invention.

Reference should now be made to FIG. 8 which, as mentioned previously, illustrates an alternative, single-ended embodiment of the present invention. A similar numbering convention has been used for this Figure as for FIGS. 2 through 7 except that the numbers have been incremented by 200; thus, an element labeled "301" in FIG. 8 would correspond to an element labeled "101" in FIG. 4 (and "1" in the prior art structure of FIG. 1).

Such a single-ended device includes only one seal assembly (408) which may be substantially identical to the seal assembly (208) shown in FIG. 7. However, in the case of the illustrated alternative embodiment, the first passageway (332A, 336A, 334A) is substantially larger in cross-sectional area than the other passageways (332B, 332C, 332D). Accordingly, the rotational symmetry of many of the individual elements of the FIG. 7 embodiment is not present in the FIG. 8 embodiment and appropriate care must therefore be taken during the assembly process to ensure the proper mating of the individual components.

Still referring to FIG. 8, it will be seen that a central bore (362) is defined by the inner surface of inner cylindrical member (408); however, the lower member (411) rather than being an annulus between the inner cylinder (408) and the outer cylinder (406), has been extended inwardly and outwardly to form a flat base member (411) provided with cutouts (391A, etc.) to accommodate the sleeves (388A, etc.) between the corresponding interior passageways (348A) and the lower conduits (357A).

Furthermore, since four passageways have been provided, in addition to the three upper pressure equalizing chambers (382, 384, 386), there is also provided a fourth such chamber (430) defined by a third piston disk (432) and an upper surface of the base plate (411), with each of the four pressure chambers (382, 384, 386, 432) corresponding with the interior passageways (348A, 348B, 348C, 348D) via an appropriately located apertures or set of apertures (404A, etc.). The upper surface of the lower adaptor (359) also functions as a lower stop for the individual sleeve elements (388A, etc.) so as to maintain them in the proper position relative to the other elements.

Thus there have been disclosed in accordance with the teachings of the present invention, several embodiments which satisfy some or all of the objectives thereof. While the invention has been described in detail with respect to certain specific embodiments, it is evident that many alternatives, modifications and variations will be apparent to those skilled in the art in light of the foregoing description and the drawings. Accordingly, the invention is intended to embrace all such alternatives, modifications and variations as fall within the spirit and broad scope of the appended claims.

We claim:

1. A flexible connector having multiple passageways comprising:

a housing defining a bore oriented about a first longitudinal axis;

an angularly deflectable nipple defining a plurality of first passageways oriented essentially parallel to a second axis, said first passageways extending from an inner end of said nipple assembly to an outer end of said nipple assembly, with the radial and circumferential orientation of said first passageways with respect to said second axis defining a first pattern;

a seat having an inner end adapted to slide within said bore along said first longitudinal axis, said seat defining a plurality of second passageways oriented generally parallel to said first longitudinal axis and extending from an outer end of said seat to said inner end of said seat, with said second passageways oriented radially and circumferentially with respect to said first axis in a second pattern substantially identical to said first pattern, whereby when said first axis and said second axis are maintained in a co-axial relationship with the inner end of said nipple adjacent said outer end of said seat, each of said first passageways may be essentially aligned with a corresponding one of said second passageways;

a plurality of sleeves oriented generally parallel to said first longitudinal axis with each of said sleeves defining a respective continuation passageway from a respective one of said second passageways to a respective one of a third plurality of passageways;

first sealing means for accommodating longitudinal movement of said seat with respect to said housing while maintaining a fluid-tight relationship between the respective one of said continuation passageways within said sleeve and the respective ones of said second and third passageways;

a piston plate having a cross-sectional shape and dimension such that when placed within said bore of said housing, adjacent said inner end of said seat and said sleeves, whereby there is defined between said piston plate, said seat said sleeves and the inner diameter of said bore a first pressure chamber which will expand in volume as said piston plate is slid along said first longitudinal axis away from said seat;

second sealing means for maintaining a pressure and fluid-tight seal between said piston plate and said central bore as said piston plate is slid longitudinally with respect thereto;

third sealing means between said first piston plate and said sleeves for maintaining a pressure and fluid-tight seal therebetween as said piston plate moves longitudinally with respect to said seat; and first aperture means between the interior of a first one of said sleeves and said first pressure chamber for equalizing the pressure therebetween; and means to hold the joint elements in an assembled and functional relationship.

2. The flexible connector of claim 1 further comprising:
a second pressure chamber substantially similar in cross-sectional area to said first pressure chamber and separated therefrom by said first piston plate, and
second aperture means between the interior of a second one of said sleeves and said second pressure chamber.

3. The flexible connector of claim 2 further comprising a second piston plate for defining a remaining portion of said second pressure chamber.

4. A flexible connector having multiple passageways comprising:
a housing defining a central bore oriented about a longitudinal axis;
a pair of angularly deflectable nipple assemblies each protruding from the opposing ends of said bore and, defining a first and second set of passageways oriented essentially parallel to said longitudinal axis, said passageways extending from an inner end of each said nipple assembly to an outer end of each nipple assembly, with a radial and circumferential orientation of said passageways with respect to said longitudinal axis;
a pair of seat assemblies each having an inner end adapted to slide within said bore along said longitudinal axis, said seat assemblies defining a third and fourth set of passageways oriented generally parallel to said longitudinal axis and extending from an outer end of each seat assembly to an inner end of each seat assembly, with said third and fourth sets of passageways interposed between and oriented radially and circumferentially with respect to said axis, whereby when said second axis is maintained in a co-axial relationship with the inner end of each nipple assembly is adjacent the outer end of said seat assembly, each passageway of said first and second sets of first passageways will be essentially aligned with a corresponding passageway in said third and fourth sets of passageways;
a plurality of sleeves positioned between said seat assemblies and oriented generally parallel to said longitudinal axis with each of said sleeves defining a respective continuation passageway from each passageway in said third set of passageways to a respective passageway in said fourth set of passageways;
a first set of sealing means for accommodating longitudinal movement of said seat assemblies with respect to said housing while maintaining a fluid-tight relationship between the continuation passageways within said sleeve and the respective ones in said third and fourth sets of passageways;
a pair of piston plates each having a cross-sectional shape and dimension such that when placed within said central bore of said housing adjacent said inner end of each seat assembly and about said sleeves there are defined pressure chambers which will expand in volume as said piston plates slide along said longitudinal axis away from said seat assemblies;
a second set of sealing means for maintaining a fluid-tight seal between said piston plates and said central bore as said piston plates slide longitudinally with resepct thereto;
a third set of sealing means between said piston plates and said sleeves for maintaining a fluid-tight seal therebetween as said piston plates move longitudinally with respect to said seat assemblies;
nipple sealing means for effecting a fluid-tight seal between said first and third set of passageways and said second and fourth set of passageways;
first aperture means between the interior of a first one of said sleeves and one of said pressure chambers for equalizing the pressure therebetween, and means to hold the joint elements in assembled and functional relationship.

5. The flexible connector of claim 4 further comprising:
second aperture means between the interior of a second one of said sleeves and the other pressure chamber for equalizing pressure therebetween.

* * * * *